United States Patent
Chai

(10) Patent No.: US 9,738,326 B2
(45) Date of Patent: Aug. 22, 2017

(54) STRUCTURE OF REAR PACKAGE TRAY

(71) Applicant: Hyundai Motor Company, Seoul (KR)

(72) Inventor: Suk-Jun Chai, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/940,768

(22) Filed: Nov. 13, 2015

(65) Prior Publication Data

US 2017/0015362 A1   Jan. 19, 2017

(30) Foreign Application Priority Data

Jul. 14, 2015  (KR) .......................... 10-2015-0099787

(51) Int. Cl.
*B62D 25/08* (2006.01)
*B60R 22/34* (2006.01)

(52) U.S. Cl.
CPC ............ *B62D 25/087* (2013.01); *B60R 22/34* (2013.01); *B60R 2022/3402* (2013.01)

(58) Field of Classification Search
CPC .... B62D 25/08; B62D 25/087; B62D 25/088; B62D 25/2027; B62D 25/06; B62D 33/0222; B60R 2022/3402; B60R 22/34; B60R 2011/0028; B60R 2021/0253; B60R 22/24

See application file for complete search history.

(56) References Cited

U.S. PATENT DOCUMENTS

| | | | | |
|---|---|---|---|---|
| 4,167,277 A * | 9/1979 | Rumpf | ..................... | B60R 22/34 280/807 |
| 5,253,896 A * | 10/1993 | Verbeski | ................ | B62D 25/06 280/801.1 |
| 5,671,968 A * | 9/1997 | Masuda | ............... | B62D 21/157 296/187.12 |
| 6,619,729 B2 * | 9/2003 | Kimura | .................. | B60J 5/0477 296/203.01 |
| 6,666,501 B1 * | 12/2003 | Logan | .................... | B62D 21/10 296/193.07 |
| 6,880,857 B2 * | 4/2005 | Schwarz | ................. | B60R 22/24 280/801.1 |
| 7,328,918 B2 * | 2/2008 | Hirotani | ................ | B60R 22/023 280/803 |
| 7,377,550 B2 * | 5/2008 | Lee | ......................... | B60R 22/24 280/803 |
| 7,819,429 B2 * | 10/2010 | Amano | ................... | B60R 22/24 280/801.1 |

(Continued)

FOREIGN PATENT DOCUMENTS

JP        57-31257 U    2/1982
JP     2000-108845 A   4/2000

(Continued)

*Primary Examiner* — Paul N Dickson
*Assistant Examiner* — Timothy Wilhelm
(74) *Attorney, Agent, or Firm* — Morgan Lewis & Bockius LLP

(57) ABSTRACT

A rear package tray structure may include left and right side members oriented vertically from a floor panel, and a tray member to connect upper ends of the side members, in which the tray member and the side members are shaped with empty spaces defined therein extending in longitudinal directions thereof, respectively, and are connected to one another such that the empty spaces fluidly communicate with each other.

5 Claims, 8 Drawing Sheets

(56) References Cited

U.S. PATENT DOCUMENTS

| | | | | |
|---|---|---|---|---|
| 9,010,847 | B2* | 4/2015 | Katou | B62D 25/087 |
| | | | | 296/193.08 |
| 9,193,391 | B2* | 11/2015 | Mildner | B62D 25/16 |
| 2014/0021748 | A1* | 1/2014 | Park | B62D 25/08 |
| | | | | 296/203.04 |
| 2015/0344072 | A1* | 12/2015 | Mildner | B62D 21/152 |
| | | | | 296/187.11 |

FOREIGN PATENT DOCUMENTS

| | | |
|---|---|---|
| JP | 2006-256351 A | 9/2006 |
| JP | 2011-5969 A | 1/2011 |
| JP | 5529225 B2 | 6/2014 |
| KR | 10-1993-0023228 A | 12/1993 |
| KR | 10-2015-0071789 A | 6/2015 |

* cited by examiner

<Structure of Present Invention>

<Conventional Structure>

<Structure of Present Invention>

<Conventional Structure>

<Structure of Present Invention>

<Conventional Structure>

STRUCTURE OF REAR PACKAGE TRAY

CROSS-REFERENCE TO RELATED APPLICATION

The present application claims priority to Korean Patent Application No. 10-2015-0099787, filed Jul. 14, 2015, the entire contents of which is incorporated herein for all purposes by this reference.

BACKGROUND OF THE INVENTION

Field of the Invention

The present invention relates to a structure of a rear package tray in a passenger vehicle, and more particularly to a rear package tray structure in which empty spaces each having a closed section are formed in side members and package members, and are connected to one another, to communicate with each other, thereby forming an annular space extending in left, upward, right and downward directions.

Description of Related Art

A rear package tray in a vehicle (in particular, a passenger vehicle such as a hatchback, a sedan or a coupe) is a vehicle body structure arranged to partition a trunk compartment from a passenger compartment in the vehicle. The rear package tray is formed at the vehicle body between a position where a rear seat is mounted and a position where a trunk compartment is formed, to reinforce the vehicle body.

Referring to FIG. 1A, a conventional package tray is shown. As shown in FIG. 1A, the conventional package tray includes a tray member 1, and side members 2, which form a rectangular shape, together with the tray member 1. Each side member 2 includes an inner side member 2b and an outer side member 2a. The tray member 1 includes an upper tray member 1a and a lower tray member 1b.

The outer side members 2a are mounted to opposite sides of a floor panel 2, to form semicircular rear fenders to be disposed over positions where rear wheels are mounted, respectively. A suspension strut 8 is mounted beneath each outer side member 2a. The inner side members 2b stand vertically from the floor panel 2 inside respective outer side members 2a. The tray member 1 is disposed on upper ends of the inner side members 2b, to extend in a lateral direction of the vehicle body.

The tray member 1 and side members 2 are structures not only functioning to partition the trunk compartment from the passenger compartment, but also functioning to enhance rigidity of the vehicle body and, as such, an additional reinforcement member is mounted to the structures, or a steel plate having a higher rigidity is used for the structures.

Meanwhile, by law, safety belts must be mounted to a rear seat and, as such, retractors of the safety belts are installed at the package tray. In the conventional structure, mounting of each retractor is achieved by additionally mounting an upper quarter side member 5 and a lower quarter side member 4 to respectively connect the upper tray member 1a and lower tray member 1b to a quarter panel 7, and then inserting the retractor into a hole 6 formed through the upper quarter side member 5. For reference, a front package side member 9a and a rear package side member 9b are coupled to front and rear sides of the upper quarter side member 5 and lower quarter side member 4, respectively, and, as such, upper ends of the front package side member 9a and rear package side member 9b form the upper tray member 1a, and lower ends of the front package side member 9a and rear package side member 9b form the lower tray member 1b.

However, in the conventional structure in which holes 6 are formed through the upper quarter side member 5 and lower quarter side member 4, as shown in FIG. 1B, degradation of rigidity may occur. Therefore, a rear package tray having a structure capable of solving such a problem is needed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear package tray having a structure enabling mounting of a safety belt retractor while achieving enhancement in rigidity of a vehicle body and body attachment stiffness (at bolt-joined areas or welded areas).

According to various aspects of the present invention, a rear package tray structure may include left and right side members oriented vertically from a floor panel, and a tray member to connect upper ends of the side members, in which the tray member and the side members are shaped with empty spaces defined therein extending in longitudinal directions thereof, respectively, and are connected to one another such that the empty spaces fluidly communicate with each other.

Each of the side members may include an inner side member connected, at a lower end thereof, to the floor panel while being connected, at an upper end thereof, to the tray member, and an outer side member arranged outside the inner side member while having a bent plate shape, the outer side member being connected, at a lower end thereof, to the floor panel while being connected, at an upper end thereof, to a quarter panel arranged outside the tray member, the tray member may include a lower tray member connected to the inner side member, and an upper tray member arranged over the lower tray member in parallel while being vertically spaced apart from the lower tray member, and the outer side member and the upper tray member may be connected by a support member arranged inside the quarter panel.

An extension member may be mounted above the outer side member, and the extension member may be connected, at a first end thereof, to the support member while being connected, at a second end thereof, to the quarter panel.

A retractor of a safety belt may be mounted on the extension member.

The outer side member may include a vertical portion extending vertically, and a bent portion bent from the vertical portion toward the quarter panel, and the bent portion may include a lower surface at which an upper end of a suspension strut is disposed, and an upper surface at which a flange of the support member is disposed, and the bent portion may be joined to the suspension strut and the support member.

The empty space of the tray member and the empty spaces of the side members may be connected to an empty space defined in the floor panel, to fluidly communicate with each other, thereby forming a continuous empty space having an annular shape or a rectangular shape.

In accordance with the above-described configurations, an annular empty space having a closed section is formed in the rear package tray structure and, as such, an enhancement in rigidity may be achieved.

The suspension strut is connected to the support member and, as such, mounting rigidity of the suspension strut may be enhanced. In accordance with additional mounting of the extension member, rigidity may be further enhanced.

In addition, it is unnecessary to form a hole for installation of the safety belt retractor and, as such, degradation of rigidity may be prevented.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
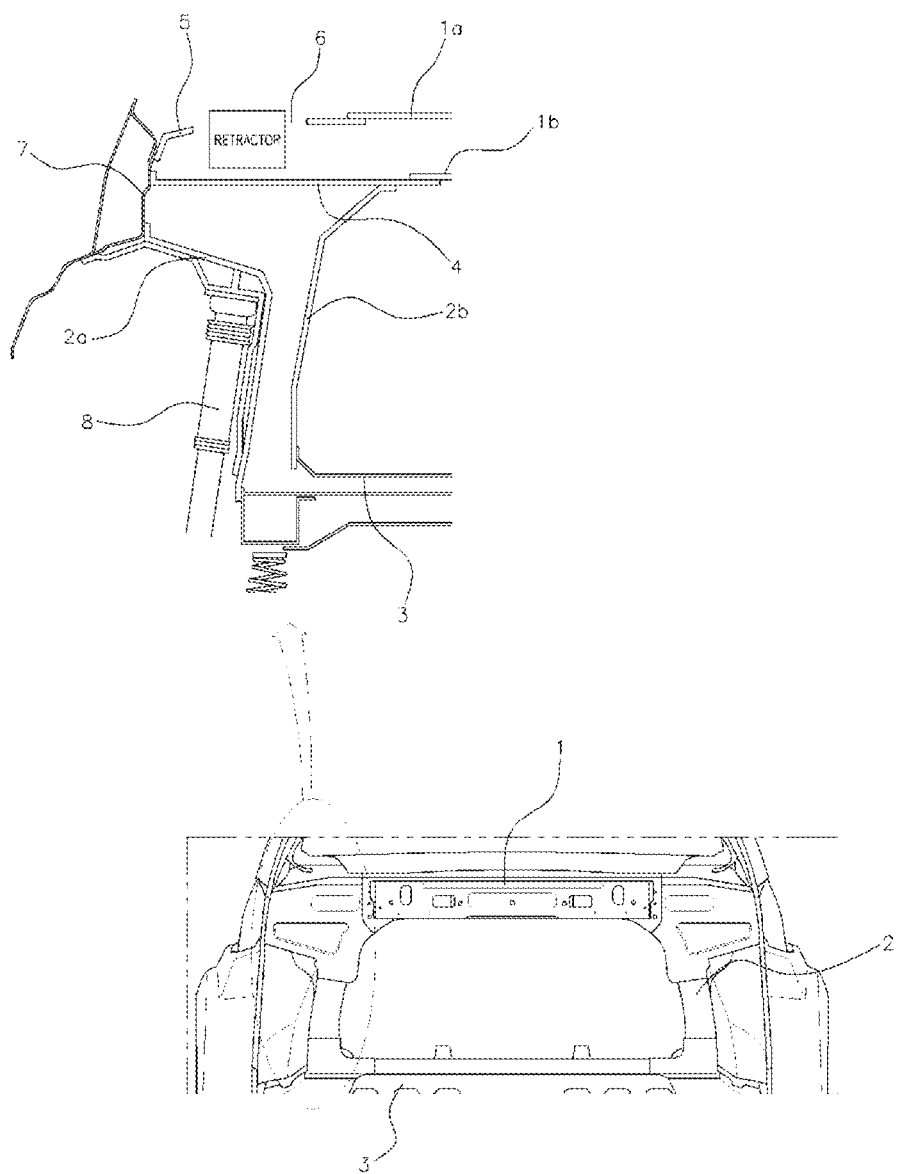
FIG. 1A is a view illustrating a front side of a conventional package tray (viewed from a front side of a vehicle body toward a rear side) and a cross-section of the conventional package tray, according to the related art.
Figure 1B:
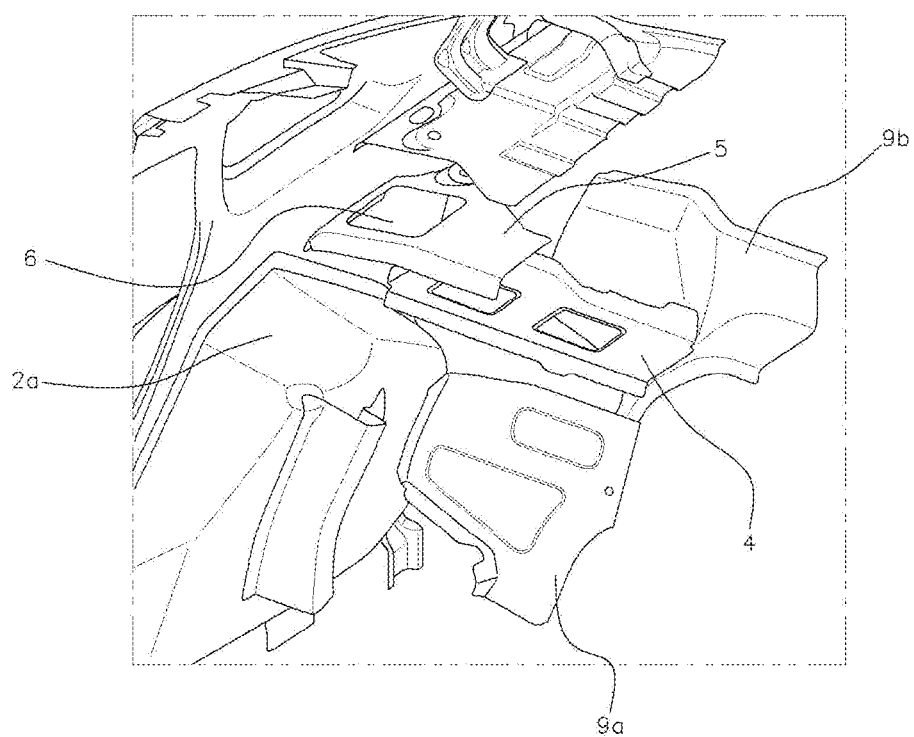
FIG. 1B is a view illustrating an exploded state of the conventional package tray, according to the related art.
Figure 2:
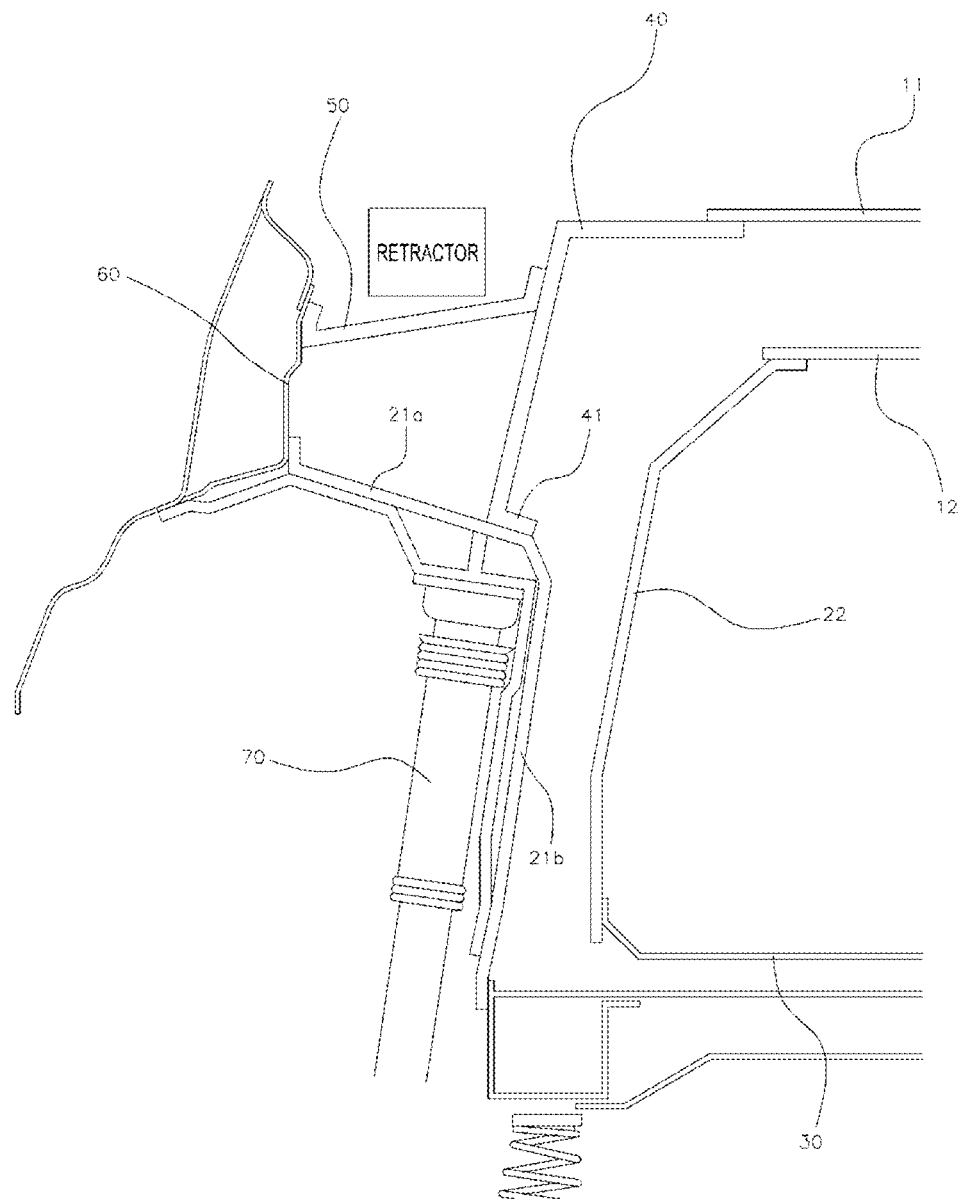
FIG. 2 is a view illustrating a cross-section of an exemplary package tray according to the present invention.

The present invention relates to a rear package tray structure in which a tray member is laterally disposed to connect upper ends of left and right side members standing vertically from a floor panel 30 included in a vehicle body. As illustrated in FIG. 2, each of the tray member and side members is shaped to define therein an empty space extending in a longitudinal direction while having a closed section. The tray member and side members are connected such that the empty space of the tray member communicates with the empty spaces of the side members.

Figure 5A:
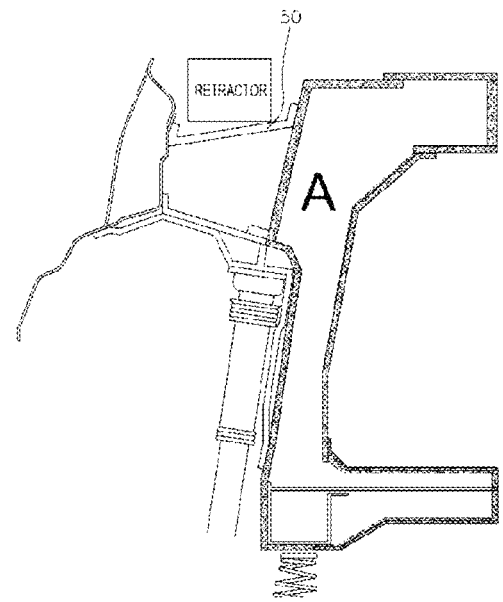
FIG. 5A and FIG. 5B are views illustrating comparison of a cross-section of the structure of the present invention with that of the conventional structure.
Figure 5B:
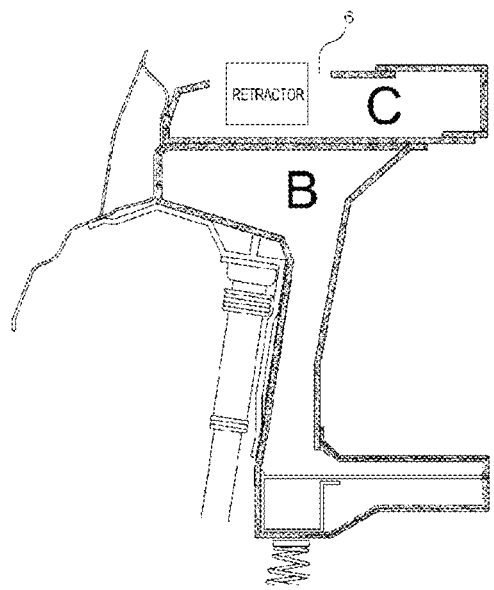

That is, as indicated by a zone A in FIG. 5A, in accordance with the present invention, the outer side members and upper tray members are connected by support members 40 disposed inside respective quarter panels 60 and, as such, empty spaces defined therein communicate with each other. However, in the conventional structure, the lower tray member included in the tray member extends to the quarter panel and, as such, the empty space thereof is partitioned into zones B and C shown in FIG. 5B.

In various embodiments of the present invention, the tray member and side members are also connected to the floor panel 30 such that the empty spaces of the tray member and side members also communicate with an empty space of the floor panel 30. Thus, the empty spaces of the tray member, side members and floor panel 30 form a continuous annular space (cf. the zone A in FIG. 5A).

In various embodiments of the present invention, each side member includes an inner side member 22 and an outer side member 21. The inner side member 22 is connected, at a lower end thereof, to the floor panel 30 while being connected, at an upper end thereof, to the tray member. The outer side member 21 is arranged outside the inner side member 22. The outer side member 21 has a bent plate shape and, as such, includes upper and lower portions 21a and 21b. The outer side member 21 is connected, at a lower end thereof, to the floor panel 30 while being connected, at an upper end thereof, to the corresponding quarter panel 60 arranged outside the tray member.

Figure 3:
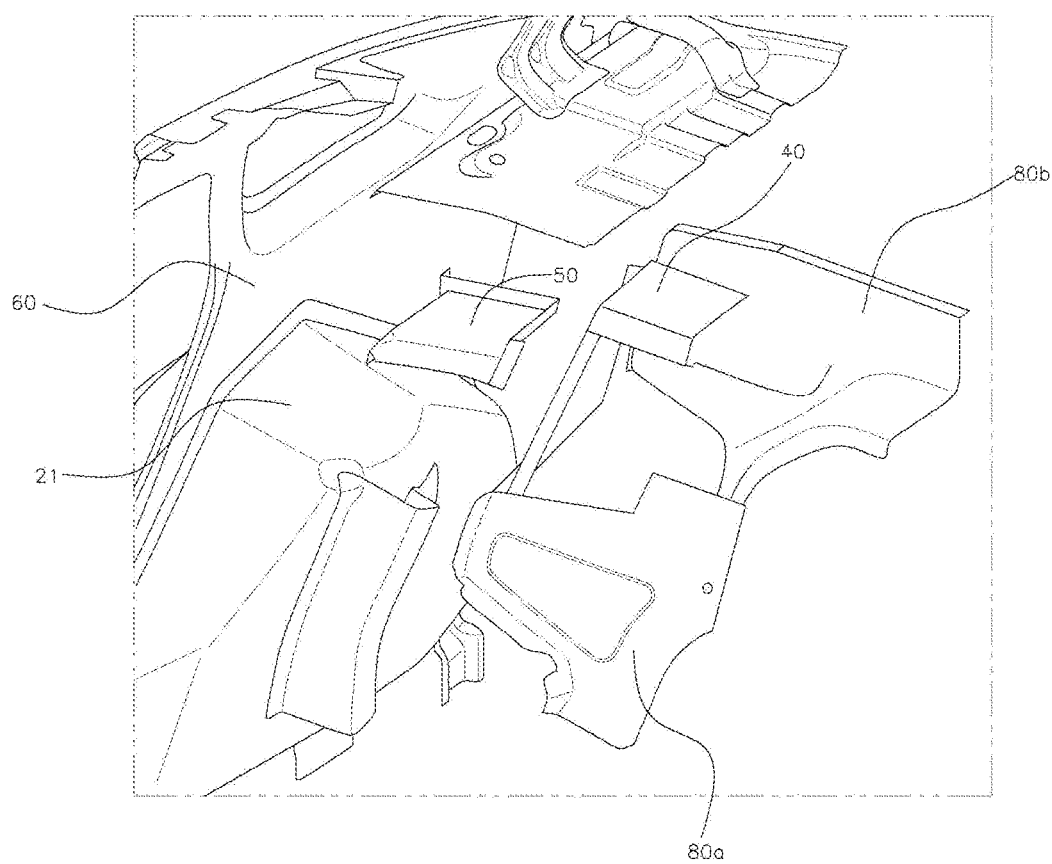
FIG. 3 and FIG. 4 are views illustrating exploded and assembled states of the package tray according to the present invention.
Figure 4:
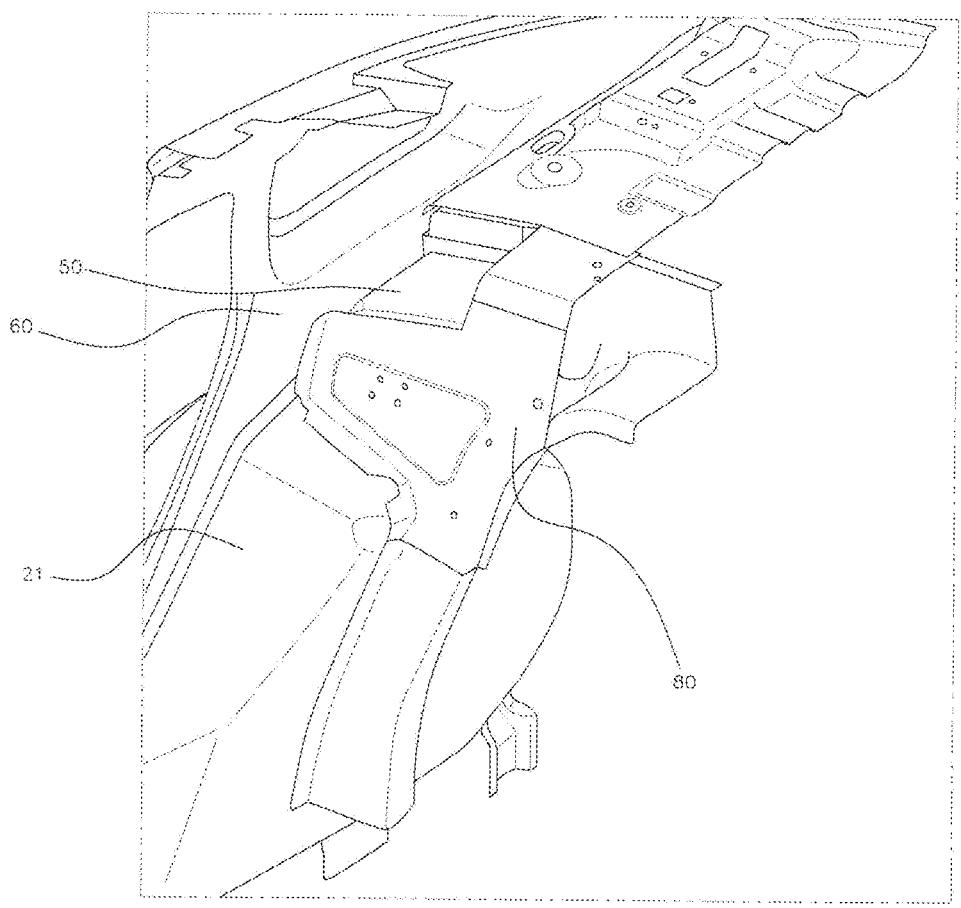

The tray member includes a lower tray member 12 connected to the inner side members 22 of the side members, and an upper tray member 11 arranged over the lower tray member 12 in parallel while being vertically spaced apart from the lower tray member 12. Similarly to the conventional structure, as illustrated in FIGS. 3 and 4, a front package side member 80a and a rear package side member 80b are arranged at a front side of the support members 40 and at a rear side of the extension members 50, respectively, and are coupled to each other, and, as such, upper ends of the front package side member 80a and rear package side member 80b constitute the upper tray member 11, and lower ends of the front package side member 80a and rear package side member 80b constitute the lower tray member 12.

Meanwhile, the tray upper member 11 of the present invention is disposed inside the quarter panels 60 (without extending to the quarter panels 60, differently than the conventional structure). The tray upper member 11 is connected, at each end thereof, to the upper portions 21a of the corresponding outer side member 21 by a corresponding one of the support members 40. Each support member 40 is formed with a flange 41 at an end thereof to be connected to the upper portion 21a of the corresponding outer side member 21.

That is, as the support member 40 connects disconnected portions of the outer side member 21 and upper tray member 11, a closed section structure is formed in a zone defined by the upper tray member 11, lower tray member 12, outer side member 21, inner side member 22, and support member 40. In more detail, the space defined between the outer side member 21 and inner side member 22 also communicate with the space defined in the floor panel 30 and, as such, the inner spaces of the tray member, side member and floor panel 30 form a continuous annular space.

Figure 6A:
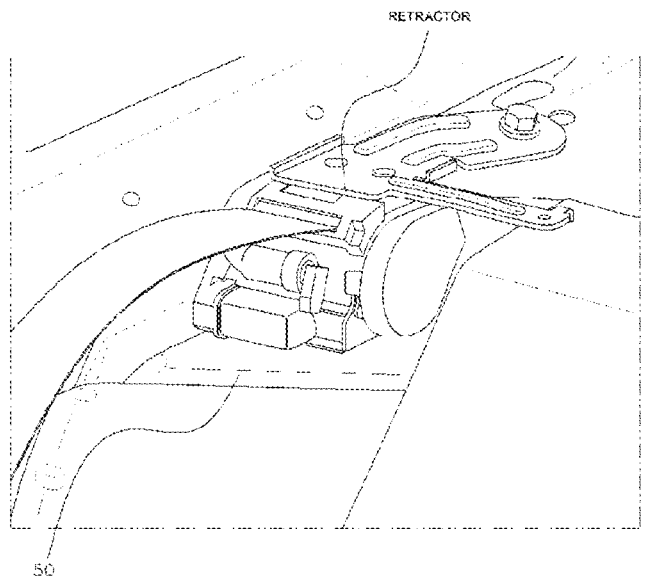
FIG. 6A and FIG. 6B are views illustrating comparison of a retractor-mounted state of the structure of the present invention with that of the conventional structure.
Figure 6B:
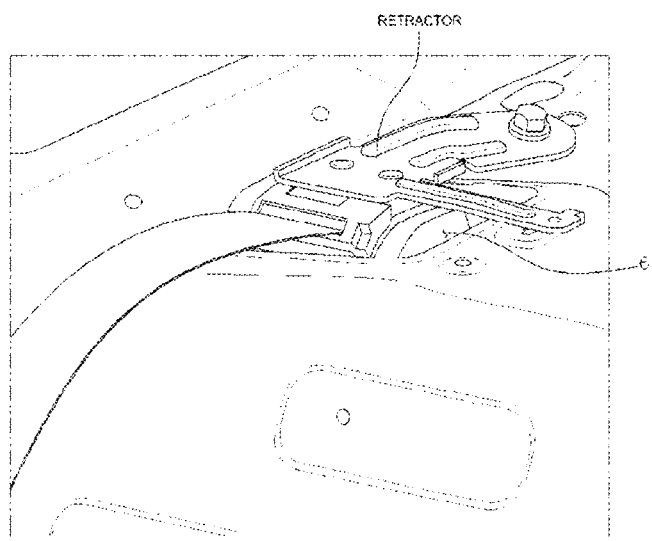

Each extension member 50 is mounted above the corresponding outer side member 21. The extension member 50 is connected, at one end thereof, to the corresponding support member 40 while being connected, at the other end thereof, to the corresponding quarter panel 60. That is, the extension member 50 not only supports the support member 40, but also supports a retractor of a safety belt such that the retractor is fixedly seated on an upper surface of the extension member 50, as illustrated in FIGS. 6A and 6B, without requiring formation of the hole 6 for insertion of the retractor, differently than the conventional structure.

In addition, the outer side member 21 has a vertical portion corresponding to the lower portion 21b, which extends vertically, and a bent portion corresponding to the upper portion 21a, which is bent from the vertical portion 21b. A suspension strut (shock absorber) 70 is disposed beneath the bent portion 21a of the outer side member 21 such that an upper end of the suspension strut 70 is disposed at a lower surface of the bent portion 21a. The flange 41 of the support member 40 is disposed at the upper surface of the bent portion 21a. The outer side member 21 is joined to the suspension strut 70 and support member 40 through bolting or welding.

In accordance with the rear package tray structure of the present invention having the above-described configuration, an annular empty space having a closed section is formed in a zone defined by the tray member, side members, support members 40, and floor panel 30 and, as such, it may be possible to achieve an enhancement in rigidity without increasing the weight of the vehicle body. Furthermore, each suspension strut 70 is connected to the corresponding support member 40 and, as such, mounting rigidity of the suspension strut 70 may be enhanced. In accordance with additional mounting of the extension members 50, rigidity may be further enhanced.

Figure 7A:
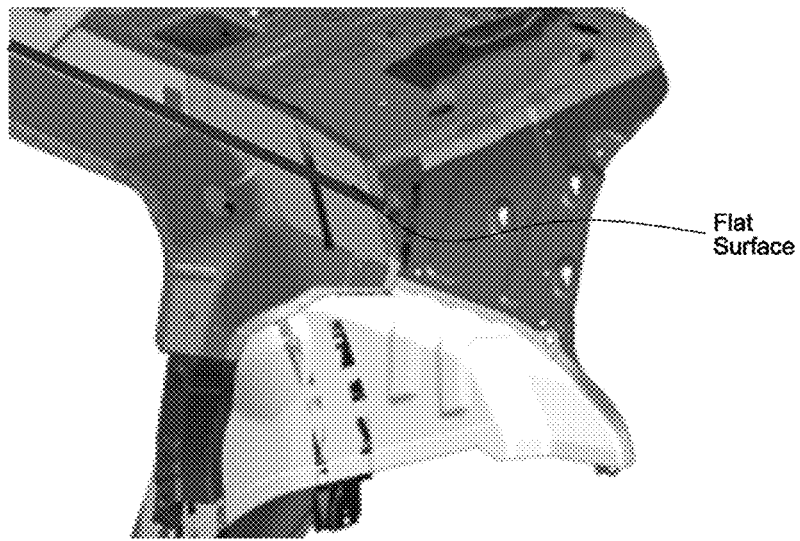
FIG. 7A and FIG. 7B are views taken when the package tray structure of the present invention is viewed from the side of the trunk compartment, to illustrate a comparison of the package tray structure of the present invention having a flat surface with the conventional package tray structure having a protruding surface.
Figure 7B:
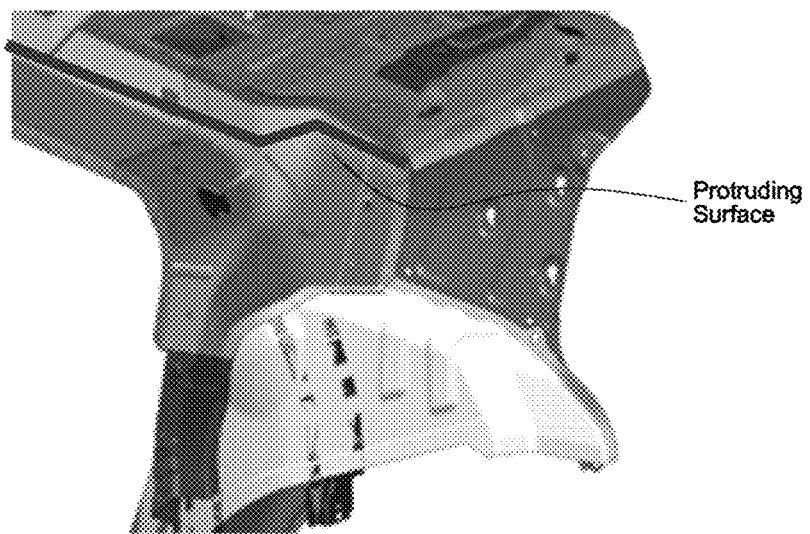

In addition, it is unnecessary to form the hole 6 for installation of a safety belt retractor and, as such, degradation of rigidity may be prevented. Meanwhile, no protruding surface is formed, as illustrated in FIGS. 7A and 7B, and, as such, the space of the trunk lid may be increased. In addition, the retractor is not inserted into a hole, but is seated on the support member 40, and, as such, shift and position adjustment of the retractor may be possible.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear package tray structure comprising:
left and right side members oriented vertically from a floor panel, and a tray member to connect upper ends of the side members,
wherein the tray member and the side members are shaped with empty spaces defined therein extending in longitudinal directions thereof, respectively, and are connected to one another such that the empty spaces fluidly communicate with each other,
wherein:
each of the side members comprises:
an inner side member connected, at a lower end thereof, to the floor panel while being connected, at an upper end thereof, to the tray member; and
an outer side member arranged outside the inner side member while having a bent plate shape, the outer side member being connected, at a lower end thereof, to the floor panel while being connected, at an upper end thereof, to a quarter panel arranged outside the tray member,
the tray member comprises:
a lower tray member connected to the inner side member; and
an upper tray member arranged over the lower tray member in parallel while being vertically spaced apart from the lower tray member, and
the outer side member and the upper tray member are connected by a support member arranged inside the quarter panel.

2. The rear package tray structure according to claim 1, wherein an extension member is mounted above the outer side member, and the extension member is connected, at a first end thereof, to the support member while being connected, at a second end thereof, to the quarter panel.

3. The rear package tray structure according to claim 2, wherein a retractor of a safety belt is mounted on the extension member.

4. The rear package tray structure according to claim 1, wherein:
the outer side member includes a vertical portion extending vertically, and a bent portion bent from the vertical portion toward the quarter panel, and
the bent portion includes a lower surface at which an upper end of a suspension strut is disposed, and an upper surface at which a flange of the support member is disposed, and the bent portion is joined to the suspension strut and the support member.

5. The rear package tray structure according to claim 4, wherein the empty space of the tray member and the empty spaces of the side members are connected to an empty space defined in the floor panel, to fluidly communicate with each other, thereby forming a continuous empty space having an annular shape or a rectangular shape.

* * * * *